United States Patent
Lam et al.

(10) Patent No.: US 8,023,259 B2
(45) Date of Patent: Sep. 20, 2011

(54) HARD DISK SECURING APPARATUS

(75) Inventors: Siu-Ming Lam, Tao Yuan Shien (TW); Hui-Tung Yu, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 258 days.

(21) Appl. No.: 12/453,303

(22) Filed: May 6, 2009

(65) Prior Publication Data

US 2010/0091443 A1   Apr. 15, 2010

(30) Foreign Application Priority Data

Oct. 14, 2008 (TW) ................ 97218346 U

(51) Int. Cl.
*G06F 1/16* (2006.01)
(52) U.S. Cl. ......... 361/679.37; 361/679.33; 361/679.58; 312/223.1; 312/223.2; 292/253; 292/256.63
(58) Field of Classification Search ............. 361/679.33, 361/679.58
See application file for complete search history.

(56) References Cited

U.S. PATENT DOCUMENTS

| 4,426,122 A * | 1/1984 | Lainez et al. ............. 361/679.55 |
| 5,484,063 A * | 1/1996 | Cuccio et al. .................. 206/722 |
| 5,666,266 A * | 9/1997 | Katoh et al. ................ 361/679.4 |
| 6,064,567 A * | 5/2000 | Cheng ........................ 361/679.31 |
| 6,185,103 B1 * | 2/2001 | Yamada ......................... 361/727 |
| 6,375,287 B1 * | 4/2002 | Lai ................................ 312/223.2 |
| 6,407,912 B1 * | 6/2002 | Chen et al. ................ 361/679.58 |
| 6,572,205 B2 * | 6/2003 | Tagawa ........................ 312/223.1 |
| 6,724,620 B1 * | 4/2004 | Arbogast et al. ......... 361/679.33 |
| 7,054,153 B2 * | 5/2006 | Lewis et al. ............... 361/679.33 |
| 7,369,402 B2 * | 5/2008 | Huang ....................... 361/679.33 |
| 7,375,959 B2 * | 5/2008 | Chang ....................... 361/679.33 |
| 7,609,508 B2 * | 10/2009 | Chen et al. ................ 361/679.33 |
| RE41,323 E * | 5/2010 | Kellerer et al. ..................... 220/7 |
| 7,791,874 B2 * | 9/2010 | Reents et al. ............. 361/679.46 |
| 7,855,884 B2 * | 12/2010 | Dong ........................ 361/679.58 |
| 2005/0094366 A1 * | 5/2005 | Lewis et al. ................... 361/685 |
| 2006/0171109 A1 * | 8/2006 | Chang ........................... 361/685 |
| 2008/0089022 A1 * | 4/2008 | Cheung et al. ................ 361/685 |
| 2008/0101008 A1 * | 5/2008 | Ulrich et al. .................. 361/685 |
| 2009/0316350 A1 * | 12/2009 | Hu ........................... 361/679.33 |

* cited by examiner

*Primary Examiner* — Jinhee Lee
*Assistant Examiner* — Anthony Q Edwards
(74) *Attorney, Agent, or Firm* — Thomas, Kayden, Horstemeyer & Risley, LLP

(57) ABSTRACT

The invention discloses a hard disk securing apparatus including an upper housing, a lower housing, and a securing module. The lower housing is fixed in an electronic apparatus and includes a block part. An accommodation space is formed between the upper housing and the lower housing and used for accommodating a hard disk of the electronic apparatus. The securing module is disposed on the upper housing, and includes a ring-shape elastic body and a clasp member extending from the ring-shape elastic body. The clasp member detachably clasps the block part of the lower housing.

10 Claims, 6 Drawing Sheets

HARD DISK SECURING APPARATUS

BACKGROUND OF THE INVENTION

1. Field of the Invention

The present invention relates generally to a hard disk securing apparatus, and particularly relates to a hard disk securing apparatus capable of installing and removing a hard disk.

2. Description of the Prior Art

Generally, electronic devices are provided with storage mediums such as hard disks or memory cards which are mainly used for storing personal data. Thereby, among various computer components, the hard disk is one of the most important components for users. Generally, the data related to daily work or entertainment is stored in the hard disks of the common operated computer. When the user is operating other computer instead of the common operated computer, he/she still needs to remove the hard disk from the common operated computer and then install the removed hard disk into the current operated computer. Besides, in those enterprises or public organizations which think highly of security of their own data, users have to remove their hard disks after work so that those hard disks can be gathered up and controlled.

In order to enable users to easily remove hard disks, removable hard disk boxes are therefore presented to the public. A hard disk is placed in a removable hard disk box and is connected to the signal connector and the power connector. Generally, the size of a removable hard disk box is equivalent to the size of a 3.5 inch optical disc drive, so the removable hard disk box can be installed in the space which was designed for the 3.5 inch optical disc drive. By doing this, when users need to take the hard disk away, what they have to do is only to remove the removable hard disk boxes without additional steps such as opening the computer casing, loosening the screws, and so on.

However, removable hard disk boxes are commonly applied to desktop computers but not laptop computers. Compared with the limited space of laptop computers, the size of a removable hard disk box is too large. Moreover, a removable hard disk box is designed to be easily installed into or detached from a computer, so the computer casing needs through-holes for the removable hard disk box passing in and out. Nevertheless, the laptop computers have specific structure designs, so the casings of laptop computers generally do not have an additional through-hole for the removable hard disk boxes passing in and out.

Hence, when users need to remove the hard disk from the laptop computers, they have to do those complex steps mentioned above (opening the computer casing and loosening the screws), and it would be very inconvenient for the user. Furthermore, compared to desk computers, the structures of laptop computers are more compact, so the removing of the hard disks of the laptop computers is not easy and could damage other components of the laptop computers.

Accordingly, the main aspect of the present invention is to provide a hard disk securing apparatus which enable users to remove hard disks easily and conveniently to solve the problems mentioned above.

SUMMARY OF THE INVENTION

An aspect of the invention is to provide a hard disk securing apparatus capable of installing and removing a hard disk quickly and easily.

According to a preferred embodiment of the invention, the hard disk securing apparatus comprises a lower housing, an upper housing, and a securing module. The lower housing is fixed in an electronic apparatus and comprises a block part. An accommodation space is formed between the upper housing and the lower housing and is used for accommodating a hard disk of the electronic apparatus.

The securing module is disposed on the upper housing and comprises a ring-shape elastic body. A clasp member extends from the ring-shape elastic body, and the clasp member detachably clasps the block part of the lower housing.

Another aspect of the present invention is to provide an electronic apparatus capable of installing and removing a hard disk quickly and easily.

According to a preferred embodiment of the invention, the electronic apparatus comprises a main housing, a hard disk and a hard disk securing apparatus. The hard disk securing apparatus comprises a lower housing, an upper housing and a securing module. The lower housing is fixed in an electronic apparatus. An accommodation space is formed between the upper housing and the lower housing and is used for accommodating a disk of the electronic apparatus. The lower housing detachably clasps the upper housing by the securing module.

Additionally, the structure and the operating method of the securing module have been described above, and these will not be described here again.

In summary, by means of the physical clasping between the clasp member disposed on the upper housing and the block part of the lower housing, the upper housing clasps the lower housing to secure the hard disk. Moreover, because the ring-shape elastic body is deformable, the clasp member extending from the ring-shape elastic body can be moved by an exterior force to detachably clasp the block part. Thus, as long as users pull the clasp member away from the block part, the upper housing can be lifted and then the hard disk can be removed, from the hard disk securing apparatus. In other words, by means of the physical deformation of the ring-shape elastic body and the clasping of the clasp member, the upper housing easily clasps the lower housing and could be easily detached from the lower housing. Thereby, the purpose of quickly and easily removing and installing the hard disk is achieved by the electronic device and the hard disk securing apparatus of the present invention.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
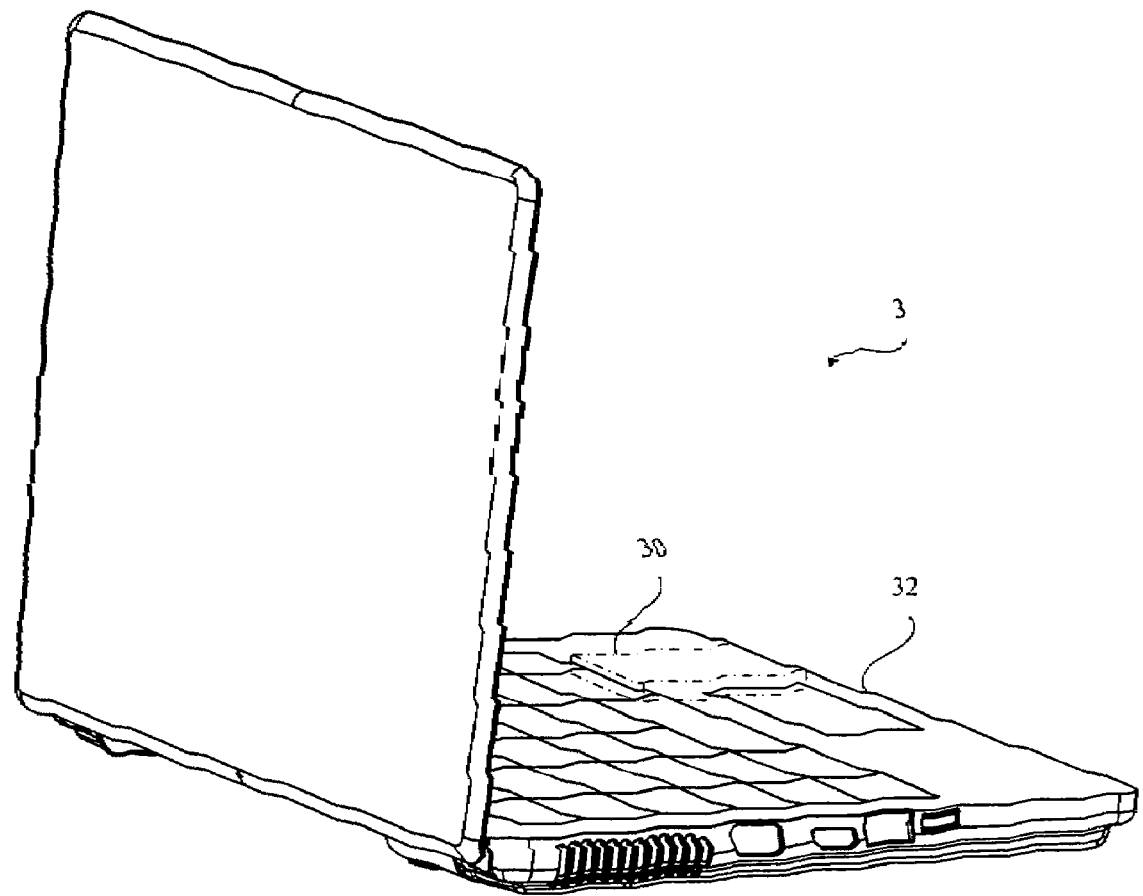
FIG. 1 illustrates a laptop computer in the present invention.

The hard disk securing apparatus of the present invention is designed for the users who need to remove and install hard disks very often. Electronic devices such as desk computers, laptop computers, video recorders with built-in hard disks, or video cameras with built-in hard disks are all provided with hard disks. In order to make the description of the invention more understandable, the following description takes a laptop computer as an example, as illustrated in FIG. 1. Generally, the hard disk securing apparatus of the invention can be hidden by the bottom casing, the palm rest, or the keyboard of the laptop computer. The hard disk securing apparatus 30 of the present invention is fixed in a main housing 32 of the laptop computer 3 and the hard disk is installed in the hard disk securing apparatus 30. The hard disk could be a magnetic head disk or a solid state disk.

Figure 2A:
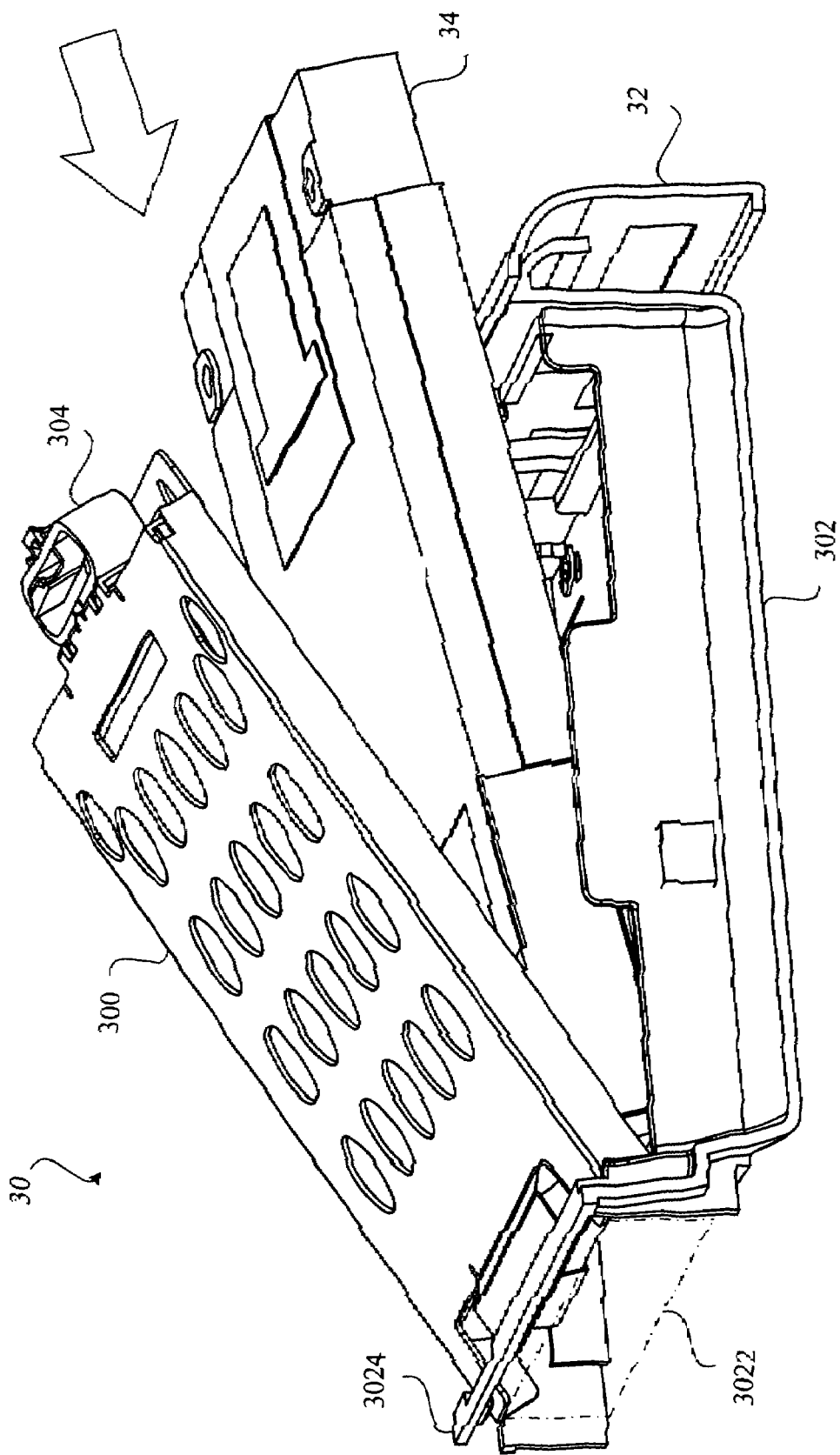
FIG. 2A through FIG. 2C illustrate the process of installing the hard disk in a hard disk securing apparatus of the invention.
Figure 2B:
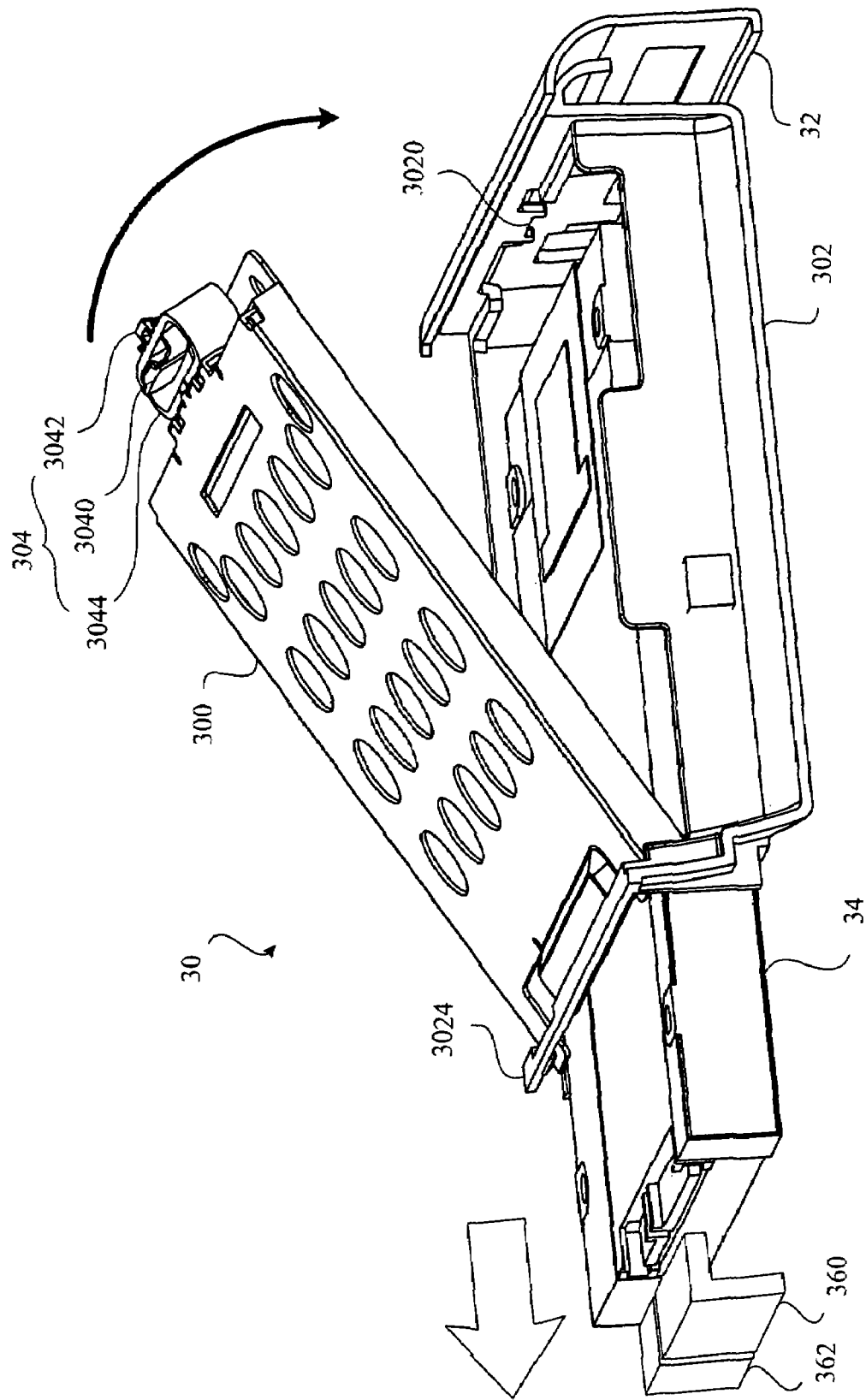
Figure 2C:
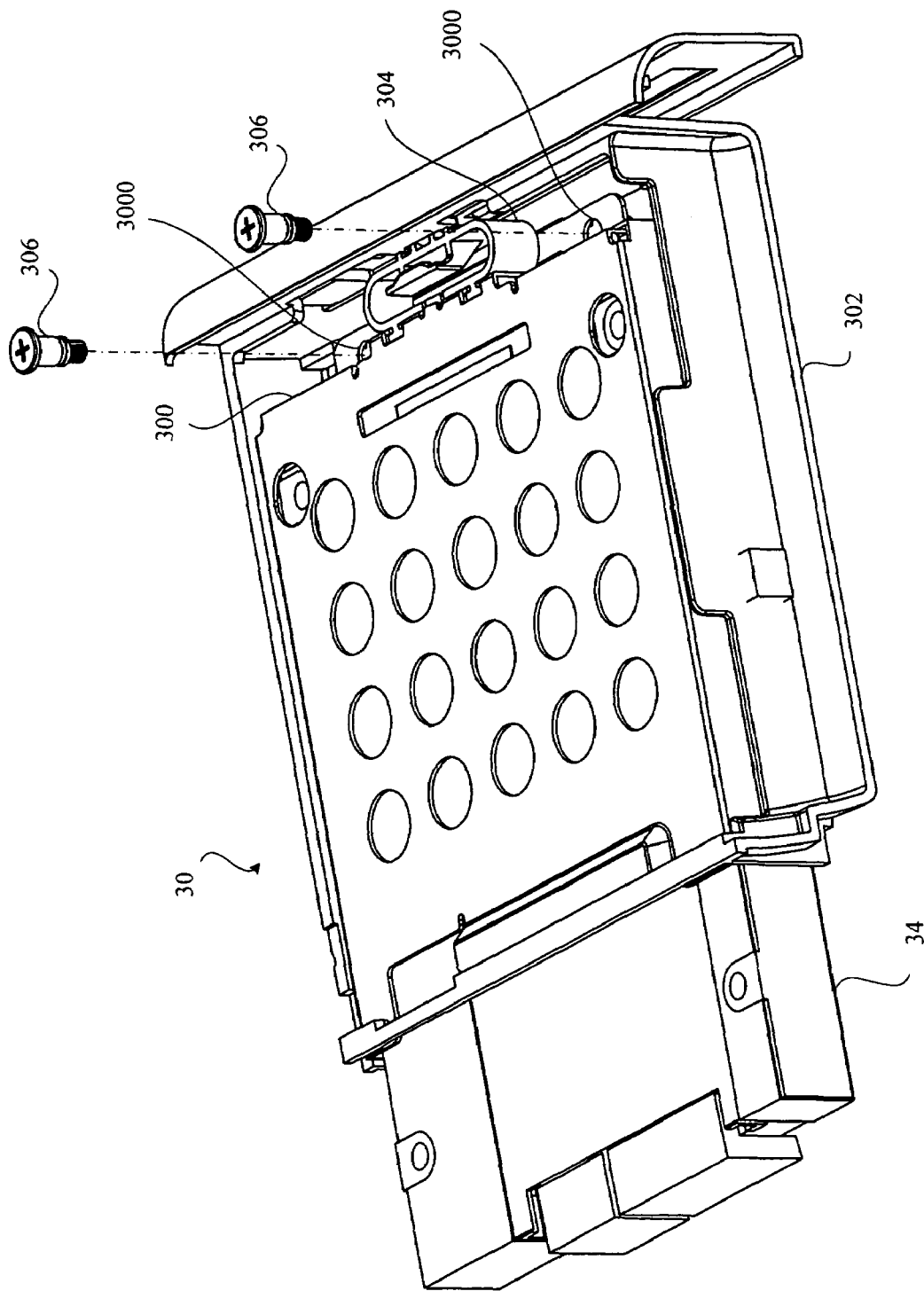

The process of installing the hard disk 34 in the hard disk securing apparatus 30 is illustrated from FIG. 2A to FIG. 2C. Firstly, as illustrated in FIG. 2A, the hard disk 34 is inserted into the hard disk securing apparatus 30 at an angle (the insert direction is shown as the hollow arrow), so the hard disk 34 could be installed in the accommodation space formed between the upper housing 300 and the lower housing 302, and the hard disk 34 passes through the opening 3022 of the lower housing 302.

Subsequently, as illustrated in FIG. 2B, the hard disk 34 is moved for a distance along the direction shown as the hollow arrow to connect to a signal connector 362 (e.g. SATA connector or PATA connector) and a power connector 360 (e.g. 4-pin connector or 15-pin connector). Thus, the hard disk 34 can transmit signals to and receive signals from the circuit board (not shown) through the signal connector 362, and the hard disk 34 can obtain power from the circuit board through the power connector 360. On the contrary, if the user wants to remove the hard disk 34 from the hard disk securing apparatus 30, the user can push the hard disk 34 forwardly for a distance to disconnect the hard disk 34 from the power connector 360 and the signal connector 362.

After that, as shown in FIG. 2B, the cross bar 3024 on one side of the opening 3022 (as shown in FIG. 2A) is taken as a rotation axle, the upper housing 300 rotates relative to the cross bar 3024 of the lower housing 302 and moves toward the lower housing 302, and the rotating and moving direction is shown as the curve arrow. Then, the securing module 304 disposed on the upper housing 300 can clasp the block part 3020 of the lower housing 302. As shown in FIG. 2C, by means of the securing module 304, the upper housing 300 can compactly clasp the lower housing 302 to secure the hard disk 34.

The clasp between the upper housing 300 and the lower housing 302 is provided by the securing module 304, and the clasping force is enough for securing the hard disk 34. However, if users do not need to frequently install and remove the hard disks in a period of time, the process shown in FIG. 2C could be executed after the process shown in FIG. 2B, in which the lock member 306 (such as a screw) is sequentially locked in the lock hole 3000 of the upper housing 300 and the lock hole (not shown) of the lower housing 302 to enhance the securing force. Of course, if users want to remove the hard disk 34, it is necessary to loosen the lock members 306 and then pull the securing module 304 away from the lower housing 302 to unclasp.

Figure 3:
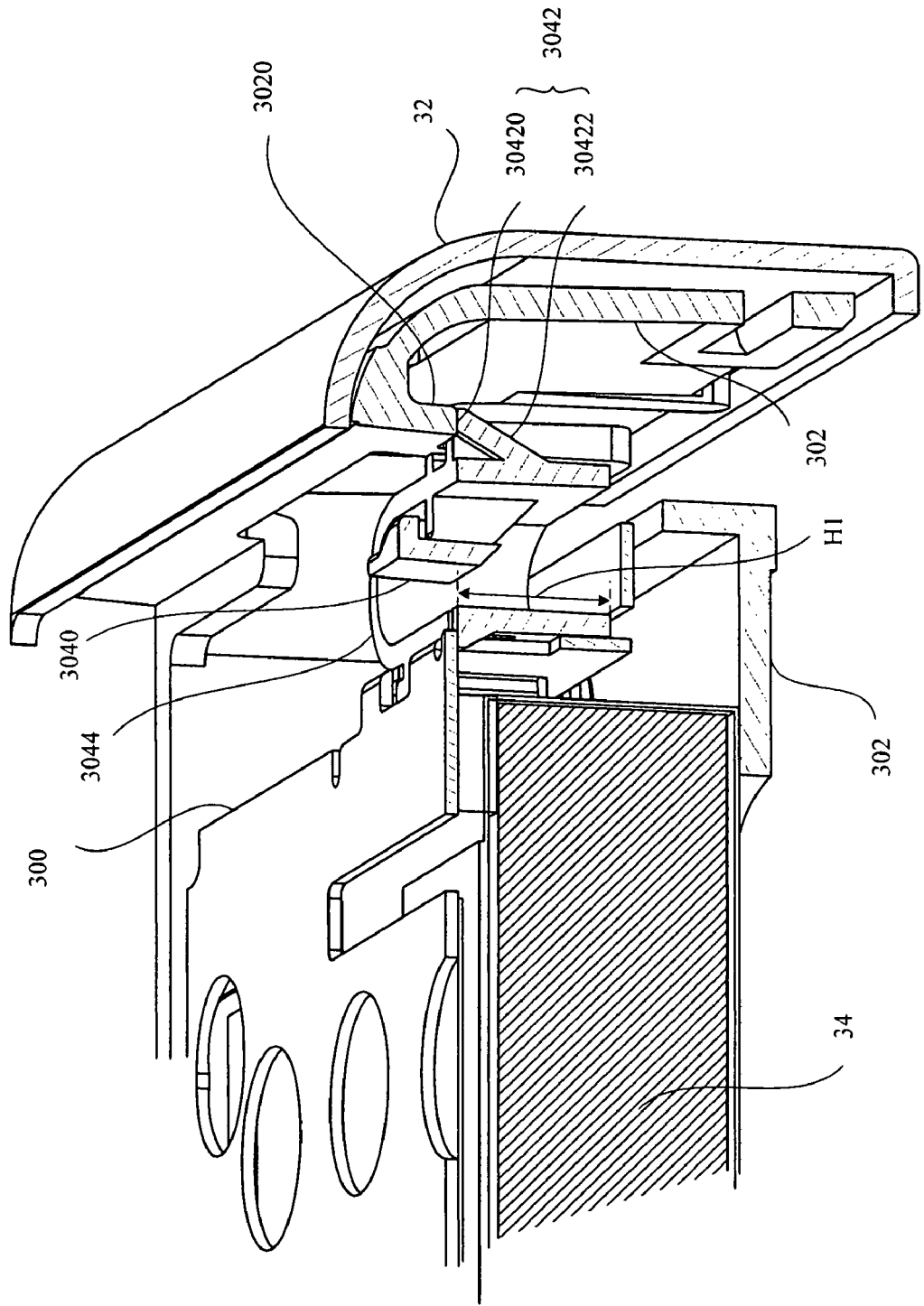
FIG. 3 is a cross-section of a clasp member in FIG. 2B clasping the lower housing.

In order to understand how the securing module 304 clasps the lower housing 302, please refer to FIG. 2B and FIG. 3. As illustrated in FIG. 2B, the securing module 304 comprises a ring-shape elastic body 3044, a clasp member 3042, and a holding part 3040. One side of the ring-shape elastic body 3044 is fixed on the upper housing 300, and the holding part 3040 and the clasp member 3042 extend from the other side of the ring-shape elastic body 3044. FIG. 3 is a cross-section of a clasp member 3042 clasping the lower housing 302 in FIG. 2B.

As illustrated in FIG. 2B to FIG. 3, the front end of the lower housing 302 is surrounded by the main housing 32. When the securing module 304 disposed on the upper housing 300 moves toward the lower housing 302, the incline part 30422 of the clasp member 3042 will be in contact with the main housing 32 at first. Then, an acute angle is included between the moving direction and the incline part 30422 of the clasp member 3042 so that the incline part 30422 will not be blocked by the main housing 32 but slide relative to the main housing 32 (meanwhile, the ring-shape elastic body 3044 is pressed and deformed). After that, the incline part 30422 is in contact with and slides relative to the lower housing 302 so that the upper housing 300 can move toward the lower housing 302. Finally, the clasp member 3042 can slide into a concave space under the block part 3020, namely, the plane part 30420 of the clasp member 3042 moves to a position under the block part 3020. If the clasp member 3042 is moved upward (i.e. the upper housing 300 is lifted), the plane part 30420 will be in contact with the block part 3020 (i.e. the clasp member 3042 is blocked by the block part 3020). Thereby, the upper housing 300 can not be detached from the lower housing 302 so that the hard disk 34 can be secured firmly.

Figure 4A:
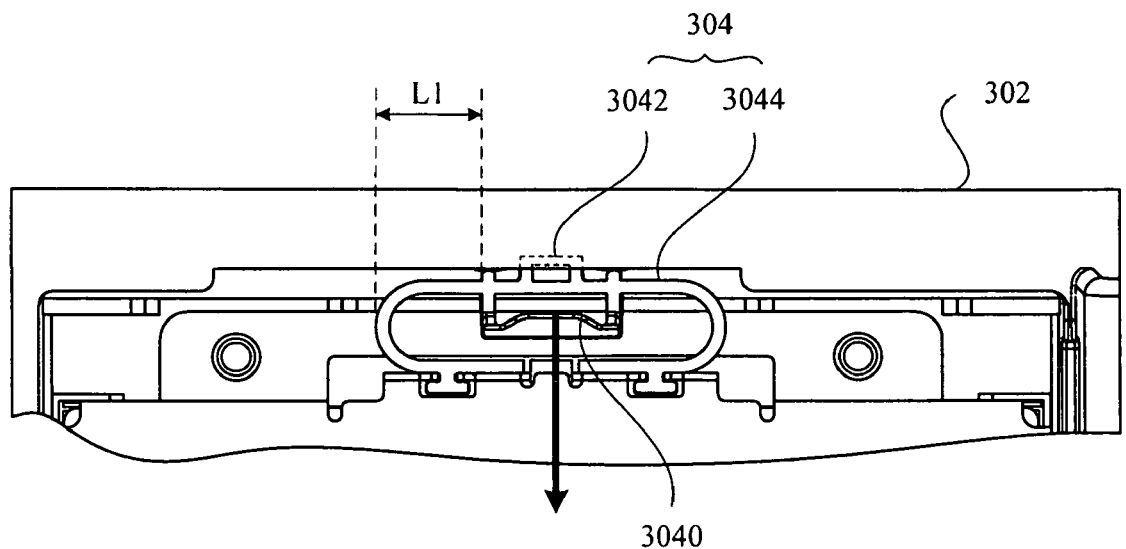
FIG. 4A is a top view of a clasp member in FIG. 2B clasping the lower housing.
Figure 4B:
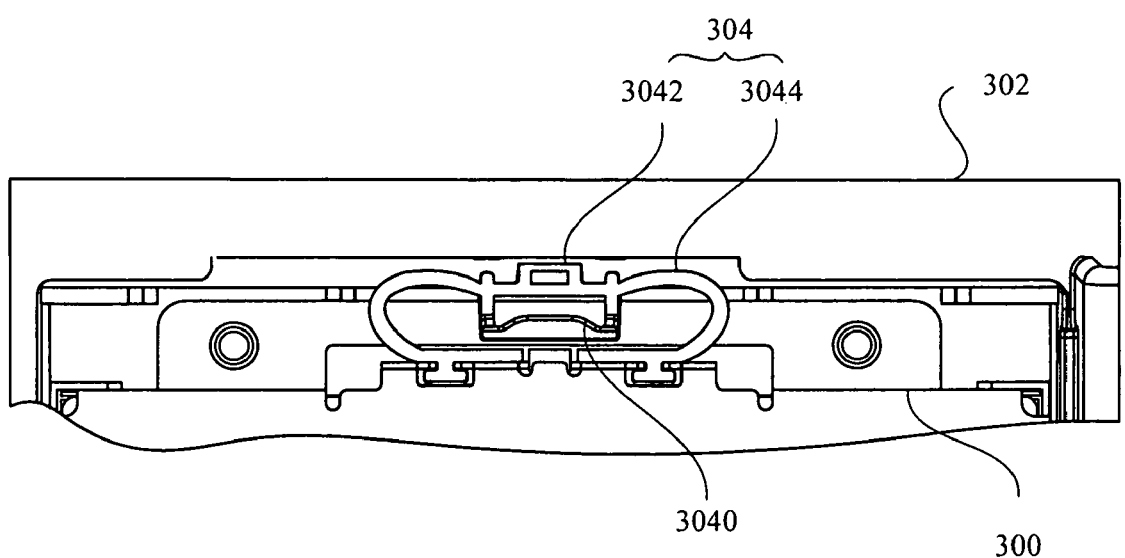
FIG. 4B is a top view of a clasp member in FIG. 4A being pulled away from the lower housing.

How the securing module 304 is moved away from the lower housing 302, please refer to FIG. 4A and FIG. 4B. FIG. 4A is a top view of a clasp member 3042 in FIG. 2B clasping on the lower housing 302. FIG. 4B is a top view of a clasp member 3042 in FIG. 4A pulled away from the lower housing 302. It should be noticed that the lower housing 302 in FIG. 2B is shielded by the main housing 32. In order to clearly describe the interaction between the lower housing 302 and the clasp member 3042, the main housing is omitted in FIG. 4A and FIG. 4B so that the lower housing 302 can be seen directly in FIG. 4A and FIG. 4B.

As illustrated in FIG. 4A and FIG. 4B, if the user wants to pull the clasp member 3042 away from the lower housing 302, the user can exert a force on the holding part 3040, and the force direction (shown as the arrow) points to the ring-shape elastic body 3044. Therefore, the holding part 3040 presses the ring-shape elastic body 3044 to deform, as illustrated in FIG. 4B. Meanwhile, the clasp member 3042 is moved away from the lower housing 302, and will not be blocked by the lower housing 302. The upper housing 300 can be lifted freely, so the hard disk (not shown in FIG. 4B) can be removed from or installed into the hard disk securing apparatus 30.

Additionally, as illustrated in FIG. 4A, the restoration force applied on the clasp member 3042 and exerted by the ring-shape elastic body 3044 is in relation to the lengths L1 of the elastic arms extended from both sides of the clasp member 3042. A longer length L1 corresponds to a smaller restoration force, so it is easier to pull the clasp member 3042 with longer elastic arms away from the lower housing 302. On the contrary, a shorter length L1 corresponds to a larger restoration force, so it is more difficult to pull the clasp member 3042 with shorter elastic arms away from the lower housing 302. Moreover, as illustrated in FIG. 3, a higher height H1 of the ring-shape elastic body 3044 corresponds to a stronger rigidity, so it is more difficult to deform the vertical shape of the ring-shape elastic body 3044, and the ring-shape elastic body 3044 with higher height can provide a larger clasp force. In summary, the design of the ring-shape elastic body 3044 needs to take the clasp force and the usability into account. The clasp member 3042 can clasp the block part 3020 firmly to secure the hard disk 34, and meanwhile the clasp member 3042 will not be pulled away difficulty.

Generally, the most common devices which provide restoration force are springs. Since the rigidity of a spring is weak, the spring can not provide enough clasp force for the clasp member 3042 force. Therefore, the spring structure needs other fixing objects to provide enough clasp force for the clasp member 3042 to firmly clasp the block part 3020. However, the inner space of a laptop computer is limited, so simpler design of the securing module 304 is better. Thus, in a limited space, the ring-shape elastic body 3044 of the invention provides enough elastic force and securing force. The hard disk 34 can be easily installed into and removed from hard disk securing apparatus 30 by means of the ring-shape elastic body 3044.

Compared to the prior art, by means of the physical clasping between the clasp member disposed on the upper housing and the block part of the lower housing, the upper housing clasps the lower housing to secure the hard disk. Moreover, because the ring-shape elastic body is deformable, the clasp member extending from the ring-shape elastic body can be moved by an exterior force to detachably clasp the block part. Thus, as long as users pull the clasp member away from the block part, the upper housing can be lifted and then the hard disk can be removed from the hard disk securing apparatus. In other words, by means of the physical deformation of the ring-shape elastic body and the clasping of the clasp member, the upper housing easily clasps the lower housing and is easily detached from the lower housing. Thereby, the purpose of quickly and easily removing and installing the hard disk is achieved by the electronic device and the hard disk securing apparatus of the present invention.

Although the present invention has been illustrated and described with reference to the preferred embodiment thereof, it should be understood that it is in no way limited to the details of such embodiment but is capable of numerous modifications within the scope of the appended claims.

What is claimed is:

1. A hard disk securing apparatus, comprising:
    a lower housing fixed in an electronic apparatus, the lower housing comprising a block part;
    an upper housing, wherein there is an accommodation space formed between the upper housing and the lower housing, the accommodation space is used for accommodating a hard disk of the electronic apparatus; and
    a securing module disposed on the upper housing, the securing module comprising a ring-shape elastic body, a clasp member extending from the ring-shape elastic body and a holding part formed inside the ring-shape elastic body, and the clasp member detachably clasping the block part of the lower housing, wherein the clasp member comprises:
    an incline part, when the incline part is in contact with the lower housing, the clasp member is pushed to move toward or away from the lower housing; and
    a plane part, wherein there is an acute angle formed between the incline part and the plane part, when the clasp member clasps the lower housing, the plane part is in contact with the block part of the lower housing, wherein one side of the ring-shape elastic body is fixed at the upper housing, and the clasp member extends from the other side of the ring-shape elastic body, and the clasp member can move toward the ring-shape elastic body to press the ring-shape elastic body,
    wherein the holding part presses the ring-shape elastic body to deform when a force is exerted on the holding part in a direction toward a center of the ring-shape elastic body.

2. The hard disk securing apparatus of claim 1, wherein the lower housing comprises an opening, the hard disk passes through the opening of the lower housing and is connected to a signal connector and a power connector of the electronic apparatus.

3. The hard disk securing apparatus of claim 2, wherein one side of the opening is a cross bar, the upper housing rotates relative to the cross bar of the lower housing.

4. The hard disk securing apparatus of claim 1, further comprising a lock member, the upper hosing and the lower housing respectively including lock holes, and the lock member locking in the lock holes to fix the upper casing on the lower casing.

5. The hard disk securing apparatus of claim 1, wherein the electronic apparatus is a laptop computer.

6. An electronic apparatus comprising:
    a main housing;
    a hard disk; and
    a hard disk securing apparatus comprising:
    a lower housing fixed on the main housing, the lower housing comprising a block part;
    an upper housing, wherein there is an accommodation space formed between the upper housing and the lower housing, the accommodation space is used for accommodating a hard disk of the electronic apparatus; and
    a securing module disposed on the upper housing, the securing module comprising a ring-shape elastic body, a clasp member extending from the ring-shape elastic body and a holding part formed inside the ring-shape elastic body, and the clasp member detachably clasping the block part of the lower housing, wherein the clasp member comprises:
    an incline part, when the incline part is in contact with the lower housing, the clasp member is pushed to move toward or away from the lower housing; and
    a plane part, wherein there is an acute angle formed between the incline part and the plane part, when the clasp member clasps the lower housing, the plane part is in contact with the block part of the lower housing, wherein one side of the ring-shape elastic body is fixed at the upper housing, and the clasp member extends from the other side of the ring-shape elastic body, and the clasp member can move toward the ring-shape elastic body to press the ring-shape elastic body,
    wherein the holding part presses the ring-shape elastic body to deform when a force is exerted on the holding part in a direction toward a center of the ring-shape elastic body.

7. The electronic apparatus of claim 6, wherein the lower housing comprises an opening, the hard disk passes through the opening of the lower housing and is connected to a signal connector and a power connector of the electronic apparatus.

8. The electronic apparatus of claim 7, wherein one side of the opening is a cross bar, and the upper housing rotates relative to the cross bar of the lower housing.

9. The electronic apparatus of claim 6, wherein the hard disk securing apparatus comprises a lock member, the upper hosing and the lower housing respectively include lock holes, and the lock member locks in the lock holes to fix the upper casing on the lower casing.

10. The electronic apparatus of claim 6, wherein the electronic apparatus is a laptop computer.

* * * * *